(12) United States Patent
Kanwathirtha et al.

(10) Patent No.: US 8,412,769 B2
(45) Date of Patent: Apr. 2, 2013

(54) SCALABLY IMAGING CLIENTS OVER A NETWORK

(75) Inventors: Hitesh Kanwathirtha, Seattle, WA (US); Manson Ng, Bellevue, WA (US); Prashant Khanduri, Bellevue, WA (US); Jason A. Antonelli, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 249 days.

(21) Appl. No.: 12/880,743

(22) Filed: Sep. 13, 2010

(65) Prior Publication Data

US 2012/0066288 A1    Mar. 15, 2012

(51) Int. Cl.
*G06F 15/16* (2006.01)
(52) U.S. Cl. ............... 709/203; 709/224; 709/222
(58) Field of Classification Search ........... 709/203, 709/224; 713/2
See application file for complete search history.

(56) References Cited

U.S. PATENT DOCUMENTS

| | | | | |
|---|---|---|---|---|
| 6,041,349 A * | 3/2000 | Sugauchi et al. | ............... | 709/223 |
| 6,735,692 B1 * | 5/2004 | Murphrey et al. | ............... | 713/1 |
| 7,080,134 B2 * | 7/2006 | Doherty et al. | ............... | 709/221 |
| 7,174,371 B2 | 2/2007 | Elo et al. | | |
| 7,624,183 B2 | 11/2009 | Paul et al. | | |
| 7,734,738 B2 | 6/2010 | Daniel et al. | | |
| 8,019,890 B2 * | 9/2011 | Abe | ............... | 709/245 |
| 8,140,683 B2 * | 3/2012 | French et al. | ............... | 709/227 |
| 2002/0073249 A1 * | 6/2002 | French et al. | ............... | 710/8 |
| 2002/0161868 A1 * | 10/2002 | Paul et al. | ............... | 709/221 |
| 2005/0010835 A1 * | 1/2005 | Childs et al. | ............... | 714/6 |
| 2005/0091387 A1 * | 4/2005 | Abe | ............... | 709/228 |
| 2007/0253437 A1 * | 11/2007 | Radhakrishnan et al. | .... | 370/401 |
| 2008/0046708 A1 * | 2/2008 | Fitzgerald et al. | ............... | 713/2 |
| 2008/0147830 A1 * | 6/2008 | Ridgill et al. | ............... | 709/222 |
| 2009/0164555 A1 * | 6/2009 | Bezanson et al. | ............... | 709/203 |
| 2010/0269155 A1 * | 10/2010 | Droms et al. | ............... | 726/3 |
| 2011/0194561 A1 * | 8/2011 | Kompella | ............... | 370/392 |

FOREIGN PATENT DOCUMENTS

JP    2002169694 A  *  6/2002
WO   WO 2009105976 A1 *  9/2009

OTHER PUBLICATIONS

"Howto: Setup Your Own DHCP Server on Linux—And have it to allot IPs dynamically"—Published Date: Feb. 5, 2005 http://www.astahost.com/info.php/Howto-Setup-Dhcp-Server-Linux_t2602.html.

(Continued)

*Primary Examiner* — Wing F Chan
*Assistant Examiner* — Kostas Katsikis
(74) *Attorney, Agent, or Firm* — Microsoft Corporation

(57) ABSTRACT

Techniques exist for imaging clients over a network, such as the preboot execution environment (PXE) protocol. However, such techniques may not scale well (e.g., using broadcast messages and having few facilities for distributing the imaging service over several servers) and limited capacity to choose a particular image for a particular client. Instead, a set of servers may be configured such that each server is assigned a set of clients, and when a client sends an imaging query, only the server to which the client is assigned sends a reply. For example, a PXE server also comprising a DHCP server may reply to queries only for clients having a DHCP reservation on the server. The servers may also be configured to refer to a network map (e.g., a manageability data store) in order to identify the role of the client and the appropriate image to direct the client to apply.

20 Claims, 7 Drawing Sheets

OTHER PUBLICATIONS

Heywood, Drew, "NDS and DHCP: Configuring DHCP for a Complex Environment"—Published Date: Apr. 1, 1999, pp. 1-12, http://support.novell.com/techcenter/articles/nc1999_05b.html.
"Configuring DHCP"—Retrieved Date: Jun. 24, 2010 http://www.cisco.com/en/US/docs/ios/12_2/ip/configuration/guide/1cfdhcp.pdf.
"Mac Marshal"—Copyright © 2009 Cyber Security Technologies Corporation, Retrieved Date: Jun. 24, 2010, pp. 1-5, http://www.cyberstc.com/products_mac.asp.
"How DHCP Technology Works"—Published Date: Mar. 28, 2003, pp. 1-22, http://technet.microsoft.com/en-us/library/cc780760(WS.10).aspx.

* cited by examiner

SCALABLY IMAGING CLIENTS OVER A NETWORK

BACKGROUND

Within the field of computing, many scenarios involve the use of a computer network, wherein computers connecting to the network are assigned a network address. In a dynamic host configuration protocol (DHCP) scenario, a computer may, while joining a network, issue a request to have a network address assigned to a particular network adapter, and a server that is tasked with managing the assignment of network addresses for the network (e.g., a DHCP server) may choose a previously unassigned network address and transmit it to the computer. Moreover, the DHCP server may comprise one or more reservations that associate a particular computer (identified, e.g., according to a Media Access Control (MAC) address assigned to the hardware of a network adapter of the computer) with a particular network address, such that the computer is consistently assigned the same network address upon connecting to the network.

Additionally, each computer generates a computing environment (such as an operating system, a set of drivers configured to operate various components of the computer, and a set of running processes) by storing instructions in one or more locations in memory (e.g., system memory, a hard disk drive, a solid state storage component, and a magnetic or optical disc). It may be desirable to permit one or more computers of the network to receive and apply an image, comprising a set of instructions that, if written in particular locations in the memory of the computer, configure the computing environment in a particular manner. For example, an administrator may create a set of images, each representing the memory contents of a computer operating a particular set of hardware components (via a particular set of drivers) and having a particular operating system and set of applications or processes. In order to configure a particular computer, instead of configuring the computer in an ad hoc manner (e.g., by wiping the contents of a hard disk drive, installing an operating system and a set of drivers corresponding to the hardware components of the computer, and installing and configuring a set of applications), the administrator may simply select the appropriate image for application to the computer to achieve the same configuration, thereby reducing the involvement of the administrator in the configuration of the computer. Such techniques may be particularly advantageous, e.g., where the administrator is responsible for managing a large set of computers having a small set of configurations (such as a server farm comprising many computers having a similar set of hardware components and configured in a similar manner), such that an image may be applied to many computers to produce a consistent and easily achieved configuration of each computer.

Where a large set of computers is connected over a network, it may be advantageous to permit computers to discover and retrieve images over the network for local application. A particular technology identified as a preboot execution environment (PXE) is provided to permit a computer, upon booting, to broadcast a request over the network for a PXE server to identify the location of an image to be retrieved and applied by the computer. A PXE server located on the same network may respond to the request by identifying the location of a particular image on the network to be used by the computer, and the computer may proceed to retrieve the image and apply it as part of the boot cycle.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

While various techniques exist for imaging a computer over a network, these techniques often exhibit some disadvantages. As a first example, in a large network, it may be undesirable for a computer to broadcast messages over the network, since the broadcast message is often received and processed by every other computer on the network. As a second example, in a large network, it may be disadvantageous to configure a single server to retrieve and identify requests from a large set of computers, since the use of a single server process may reduce the scalability of the network (e.g., the server may be unable to handle requests from a large number of computers, such as a large number of concurrently booting computers), may degrade the performance of the network, may result in significant duplication of messages, and may represent a single point of failure that may jeopardize the operation of the entire network. As a third example, while multiple servers may be configured to handle requests to direct booting clients to images, a request from a booting computer may be handled by several servers, thereby unnecessarily increasing network traffic and potentially causing consistency problems or race conditions (e.g., if two servers direct a client to apply two different images). As a fourth example, it may be difficult for a server to identify which image is to be applied by a particular client.

Presented herein are techniques for providing for the imaging of computers over a network in a scalable and efficient manner. These techniques involve configuring respective servers on the network to manage a particular set of clients, such as a set of computers assigned to a particular role. Upon booting, a client may issue an imaging query to have an image identified for receipt and application (e.g., a PXE query). A server that receives the imaging query may determine whether or not the server is responsible for managing the client. For example, the client may issue the PXE query as part of a DHCP query while joining the network, and the server, also configured as a DHCP server, may determine its responsibility for administrating the client by determining whether it comprises a DHCP reservation for the client. If the server is responsible for administrating the client, the server may determine whether the client is directed to apply an image during the current boot cycle. For example, the server may have access to a network map that indicates a target image version that the client is directed to use, and may determine whether the client is currently using the target image version or is using a different image version. If the server determines that the client is directed to use a different image, the server may provide the image, or may identify the location of the image on the network (e.g., as part of a PXE command). In other circumstances (e.g., where the server is not responsible for administrating the client, or where the server determines that the image version of the client is up-to-date), the server may withhold a response. In this manner, servers and clients may be configured to communicate efficiently over the network with a reduced amount of chatter and fewer broadcast packets.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
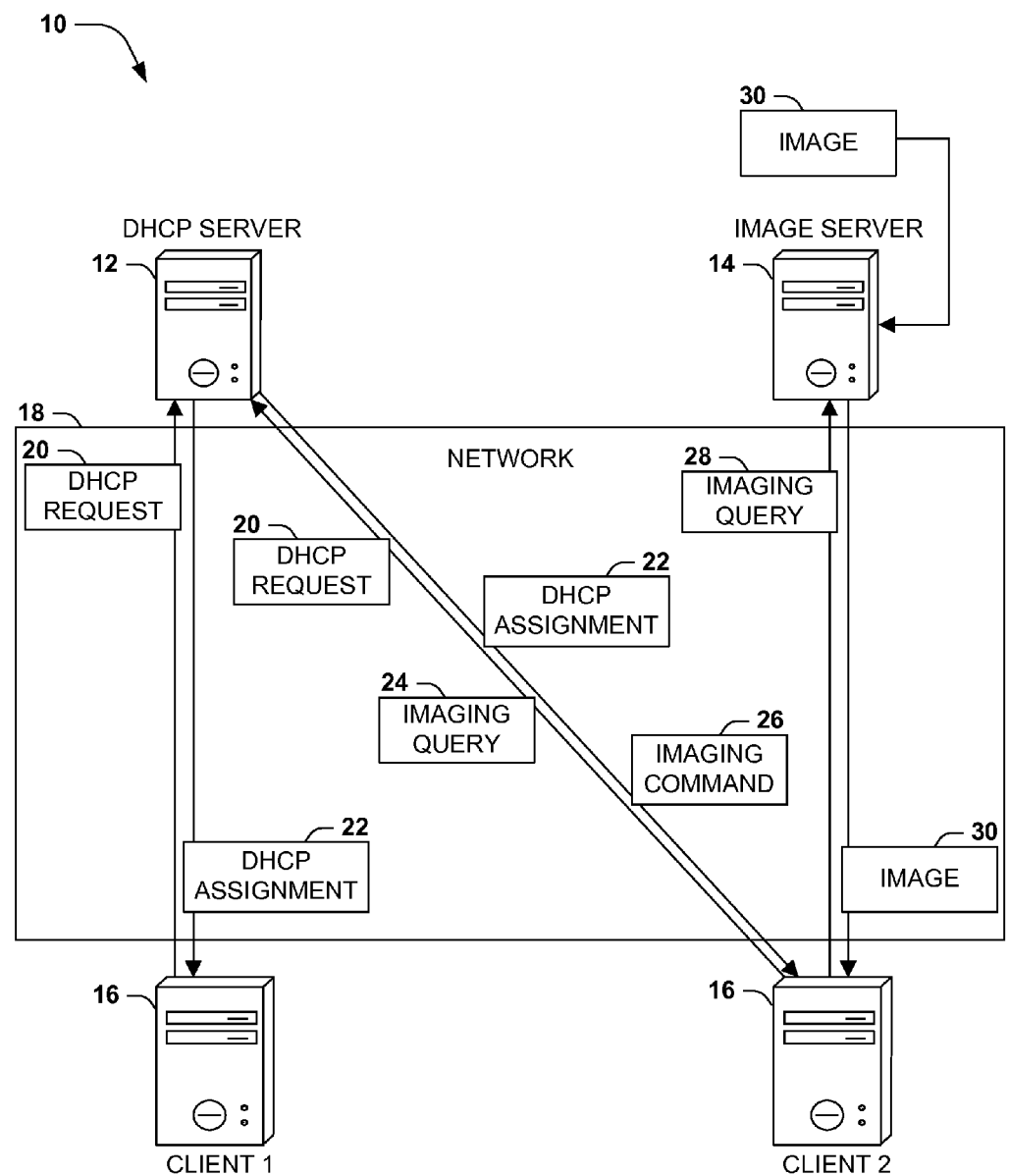
FIG. 1 is an illustration of an exemplary scenario featuring a server and an image server configured to image clients over a network.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Within the field of computing, many scenarios involve a network connecting a set of computers, each having a network address. Various servers may be positioned on the network to provide administrative services for the computers of the network. As one example, in order to avoid network address collisions (where two or more computers attempt to use the same network address), a dynamic host configuration protocol (DHCP) server may be provided on the network to allocate network addresses to computers. For example, when a computer first requests to connect to the network, a DHCP server may receive the request to connect, allocate a previously unallocated network address for the computer, and send the network address to the computer during the handshake or connection process. Additionally, the DHCP server may reserve one or more network addresses for particular computers. For example, when a computer requests to connect to the network, it may transmit an identifier, such as a Media Access Control (MAC) address assigned to a network card. The DHCP server may examine a list of reservations mapping identifiers to reserved network addresses, and upon identifying a reservation specifying the identifier of the computer, may allocate and transmit to the computer the reserved network address. In many implementations, the reservations of the DHCP server are manually configured by an administrator based on knowledge of the details of the network. In this way, the DHCP server may consistently assign particular network addresses to particular known computers, while allocating for other computers a network address from among the pool of unreserved and dynamically assigned network addresses.

Another aspect of such networking scenarios involves the configuration of the computers of the network. In a managed network, for computers having similar sets of hardware components and/or similar roles or responsibilities in the networking scenario, an administrator may endeavor to implement a similar software configuration for computers having similar characteristics. Therefore, instead of configuring each computer manually (e.g., by formatting the hard disk drive and then installing and configuring an operating system, a set of software drivers corresponding to the hardware components of the computer, and a set of software applications or running processes), an administrator may prepare an "image" to be used as a configuration template for the similar set of computers. For example, the administrator may configure one computer as desired, may capture a snapshot of the configuration (e.g., a representation of the contents of memory components of the computer, such as system memory and one or more hard disk drives), and may overwrite the contents of memory components of computers having similar characteristics with the contents of the image, thereby achieving a similar configuration of such computers with a reduced degree of user interaction of the administrator. Such configuration techniques may promote the easy and consistent configuration of computers, including brand-new computers that have similar characteristics to established computers on the network and remediation of configuration data on one or more computers that has become corrupted or faulty.

Imaging techniques may be advantageous for facilitating the administration of a large set of computers. As a first example, an organization (such as a university) may regularly purchase batches of computers for deployment in various contexts (e.g., a low-powered set of computers to be deployed as library terminals, a medium-powered set of computers to be deployed for office productivity, and a high-powered set of computers to be deployed for use in academic research). As a second example, an organization (such as a search engine or an e-commerce provider) may utilize a server farm in various contexts where the requests of all users may not be adequately fulfilled by a single server, but may involve a multitude of servers that operate in the same role in order to distribute the computational burden of the requests. In both such scenarios, the administration thereof may be facilitated by developing one image for each batch of similarly-equipped computers, such that an administrator may quickly and easily address the corruption of the configuration of a computer, the replacement of a faulty computer with a new computer, or the scaling of the network tasks to handle additional requests by adding new computers, and by using corresponding images to configure a computer according to its characteristics.

However, earlier imaging technologies relied on a portable medium, (e.g., a CD-ROM or DVD-ROM optical disc) that contained the image and that was inserted into a removable medium device. Such techniques may be undesirable for networks deployed over a large area, such as a large Ethernet deployment spanning several levels of a large building or a wireless network covering several buildings or even a large geographic area. In these scenarios, physically accessing each computer to be imaged may be inefficient. Accordingly, further techniques have been developed to achieve the imaging of a computer over the network, based on an object (such as a file) comprising an image that may be transmitted over the network to the computer and applied thereby. One such technique involves a preboot execution environment (PXE) configuration, wherein a computer is configured, as part of the boot cycle, to broadcast an imaging query over a network. A PXE server that receives the broadcast query may reply with an image location (e.g., a network path) indicating where the computer may locate an image to be applied during the boot cycle. The computer may then retrieve the image over the network and apply it to achieve a configuration over the network without involving physical access to the computer.

FIG. 1 presents an illustration of an exemplary scenario 10 featuring a network 18 over which a set of computers may communicate. In this exemplary scenario 10, one or more clients 16 may connect to the network 18 through various components, e.g., a wired Ethernet connection, a wireless connection, or a cellular network. The network 18 is serviced by a server 12 that is configured to allocate network addresses to the computers connecting to the network 18 in order to reduce collisions where two or more computers attempt to use concurrently the same network address (e.g., a dynamic host configuration protocol (DHCP) server). Accordingly, when a first client 16 initiates a connection to the network 18, the first client 16 sends a DHCP request 20 to the server 12, which assigns a previously unallocated network address to the first client 16 and replies with a DHCP assignment 22 specifying the allocated network address. However, in this exemplary scenario 10, the server 12 also serves as a PXE server, which may direct clients 16 to use one or more images 30 stored on an image server 14. Accordingly, when a second client 16 begins a boot process, the second client 16 sends a DHCP request 20 to the server 12, and the server 12 allocates a previously unallocated network address and sends it to the second client 16 in a DHCP assignment 22, but also indicates that the server 12 is configured as a PXE server. The second client 16 may then send to the server 12 an imaging query 24 requesting a reference to an image 30 that may be utilized to image the second client 16 during the boot cycle. The server 12 may reply with an imaging command 26 (e.g., a reference to a location, such as a network path, of the image 30 stored on the image server 14 to be applied to the second client 16). The second client 16 may utilize the imaging command 26 to send an imaging query 28 to the image server 14, which may send the image 30 to the second client 16 (e.g., via a file transfer protocol (FTP) or trivial file transfer protocol (TFTP) session). Upon receiving the image 30, the second client 16 may apply the image 30 as part of the boot cycle, thereby updating the configuration of the second client 16 in an automated manner over the network 18.

While the techniques illustrated in the exemplary scenario 10 of FIG. 1 present some advantages, some aspects may be inefficient or limited. As a first example, in some implementations of PXE, some messages are communicated via broadcast, resulting in the delivery of a message to all computers on the network 18; accordingly, such techniques may be difficult to scale to a network featuring thousands of computers, because network traffic from broadcast messages may deplete network capacity and increase latency. As a second example, the exemplary scenario 10 of FIG. 1 features a single server 12 and a single image server 14, which may be inadequate for servicing requests from a large number of clients 16 in a large network 18. Such problems may be exacerbated, e.g., if many clients 16 are rebooted in a short time frame or are directed to check for and install an image 14, such as following a restoration of power after a power failure or a network rejoining following a partitioning. As an alternative, an administrator may endeavor to deploy several servers 12, but in many implementations, such efforts may create additional complications. For example, broadcast messages sent from booting clients 16 may be intercepted by several servers 12, such that the computational load of handling PXE requests placed on the single server 12 in the exemplary scenario 10 of FIG. 1 is simply multiplied across several PXE servers 12. An even more significant problem may arise if, due to inadequate interoperation among the servers 12 or synchronization delays, several servers 12 respond to the imaging query 24 with imaging commands 26 directing the client 16 to use different images 30. In this case, the client 16 may arbitrarily choose one imaging command 26 and may ignore the others, or may attempt to fulfill all imaging commands 26 by applying several images 30 in an arbitrary order, thereby resulting in race conditions and unintended variations in the configuration of clients 16. As a third example, some implementations of network imaging systems cannot easily that particular clients 16 are to apply particular images 30; e.g., it may be difficult to configure the network imaging system to deploy a set of images 30 to a heterogeneous set of computers 16.

In view of these complications, techniques may be devised that promote the imaging of clients 16 over a network 18 in a manner that promotes the scalability of a network imaging system for deployment in a large network featuring a large number of clients 16, such as by a cooperative deployment of servers 12 that may efficiently allocate the servicing of imaging requests received from many clients 16. These techniques may also be devised to promote the selection of particular images 30 for particular clients 16, such that a heterogeneous body of clients 16 may be managed in this manner. Additionally, such techniques may be devised to utilize some existing technologies (e.g., the current configuration of clients 16 with PXE client implementations embedded in the boot cycle, such as system BIOS) in order to promote easy deployment of the improved techniques.

These techniques involve the configuration of one or more servers 12 to facilitate the directing of clients 16 to accept and apply images 30 (e.g., a particular configuration of PXE servers) in the following manner. As a first example, respective clients 16 of the network 18 may be assigned to a particular server 12 that is responsible for handling imaging queries 24 (e.g., PXE boot queries) received from the client 16. A server 12 receiving an imaging query 24 from a client 16 that is not assigned to the server 12 may be configured not to respond to the imaging query 24. In this manner, many clients 16 may issue imaging queries 24, and may even do so in a broadcast or multicast manner (e.g., the client 16 may be able to broadcast the imaging query 24 without knowledge of the potentially complicated and dynamic set of servers 12 that may respond to the imaging query 24), but such imaging queries 24 are only evaluated and replied to by the server 12 to which the client 16 is assigned, thereby reducing the redundant evaluation of the imaging query 24, the redundant delivery of imaging commands 26 from multiple servers 12, and the potential inconsistency of multiple imaging commands 26.

As a second example, the servers 12 may have access to a network map, such as a manageability data store (MDS), which stores information about the computers on the network 18 and the configuration thereof. For example, the network map may contain an entry for each client 16 authorized to access the network 18, possibly including the Media Access Control (MAC) address of a network adapter for each client 16 and/or a network address reserved for the client 16, and also including a current image version of the image 30 of the client 16, as well as a target image version of the image 30 that is currently applied to the client 16 (e.g., one or more indicators of which images 30 have been applied to the client 16). Upon receiving an imaging query 24 from the client 16, a server 12 may consult the network map to identify whether the client 16 is directed to apply an image 30 (e.g., whether the current image version of the client 16 matches the target image version of the client 16), and may accordingly issue to the client 16 an imaging command 26 containing an image reference to an image 30 to be applied by the client 16 (e.g., a network path of the image 30). The client 16 may then retrieve the image 30 using the image reference in the imaging command 26 (e.g., from an image server 14), and may apply the image 30 to achieve a local deployment of the target image version. In this manner, these techniques presented herein may permit the servers 12 to direct the imaging of the clients 16 by refining the implementation of existing techniques (such as PXE) in order to promote the efficient use of the network 18 and server resources and the selectivity of the imaging commands 26 given to respective clients 16, while also utilizing existing technologies (e.g., the clients 16 may utilize existing PXE client implementations embedded in the BIOS boot routines thereof).

Figure 2:
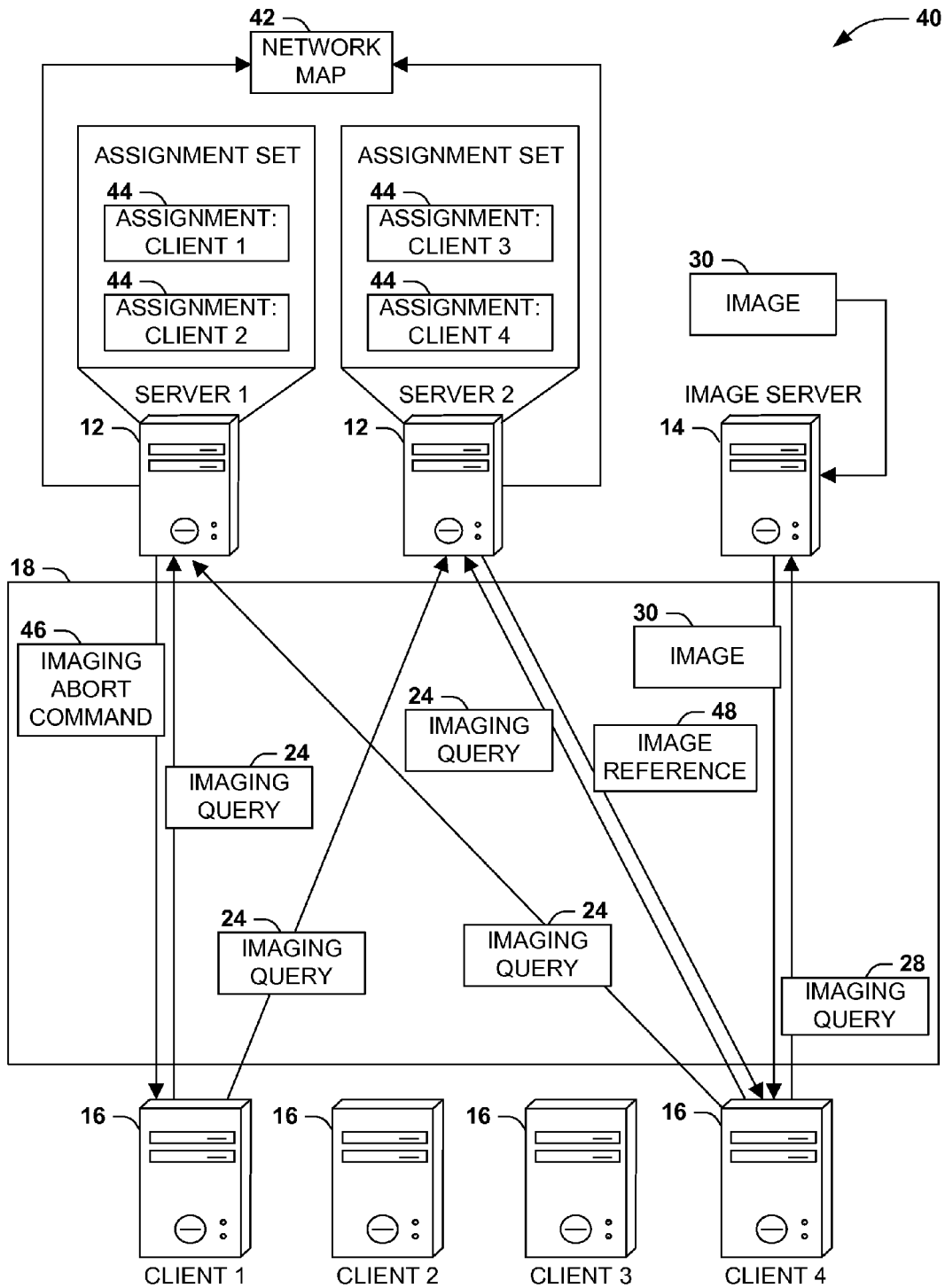
FIG. 2 is an illustration of an exemplary scenario featuring a set of servers and an image server configured to image clients over a network according to the techniques presented herein.

FIG. 2 presents an illustration of an exemplary scenario 40 featuring the use of the techniques presented herein to achieve the imaging of a set of clients 16. In this exemplary scenario 40, and in contrast with the exemplary scenario 10 of FIG. 1, several servers 12 are deployed to service the clients 16 over the network 18. Moreover, each server 12 retains a set of assignments 44, indicating which clients 16 are assigned to the server 12 for service, including the handling of imaging queries 24. For example, a first client 16 may (e.g., as part of a boot cycle, or upon connecting to the network 18) issue an imaging query 24 to the servers 12. A first server 12 to which the first client 16 is assigned may reply to the imaging query 24, but a second client 12 to which the first client 16 is not assigned may withhold a reply to the imaging query 24 in order to conserve server and network resources. Second, the first server 12 may evaluate the imaging query 24 by checking with a network map 42 to determine whether the client 16 is directed to apply an image 30 (e.g., according to the network map 42, whether the current image version of the first client 16 matches the target image version of the first client 16). In this exemplary scenario 40, the first server 12 determines that the first client 16 is not directed to apply an image 30 (e.g., determining that the current image version of the first client 16 matches the target image version of the first client 16), and may reply with an imaging abort command 46 that directs the first client 16 to abort the PXE boot inquiry and continue to boot using its current configuration. By contrast, when a fourth client 16 that is assigned to the second server 16 issues an imaging query 24 to the servers 12, the first server 16 may withhold a reply, but the second server 12 may evaluate the imaging query 24 by consulting the network map 42; and upon determining that the fourth client 16 is directed to apply an image (e.g., determining that the current image version of the fourth client 16 does not match the target image version of the fourth client 16), and may reply with an image reference 48 (e.g., a network path whereby the image 30 to be applied may be accessible over the network 18 from an image server 14). The fourth client 16 may then send an imaging query 28 to the image server 14, which may transmit the image 30 to the fourth client 16 over the network 18, and the fourth client 16 may apply the image 30 in order to achieve the directed configuration. In this manner, the servers 12 in the exemplary scenario 40 of FIG. 2 may utilize the techniques presented herein to achieve the configuration of the clients 12 over the network 18 in a more scalable, consistent, and customizable manner than other imaging techniques.

Figure 3:
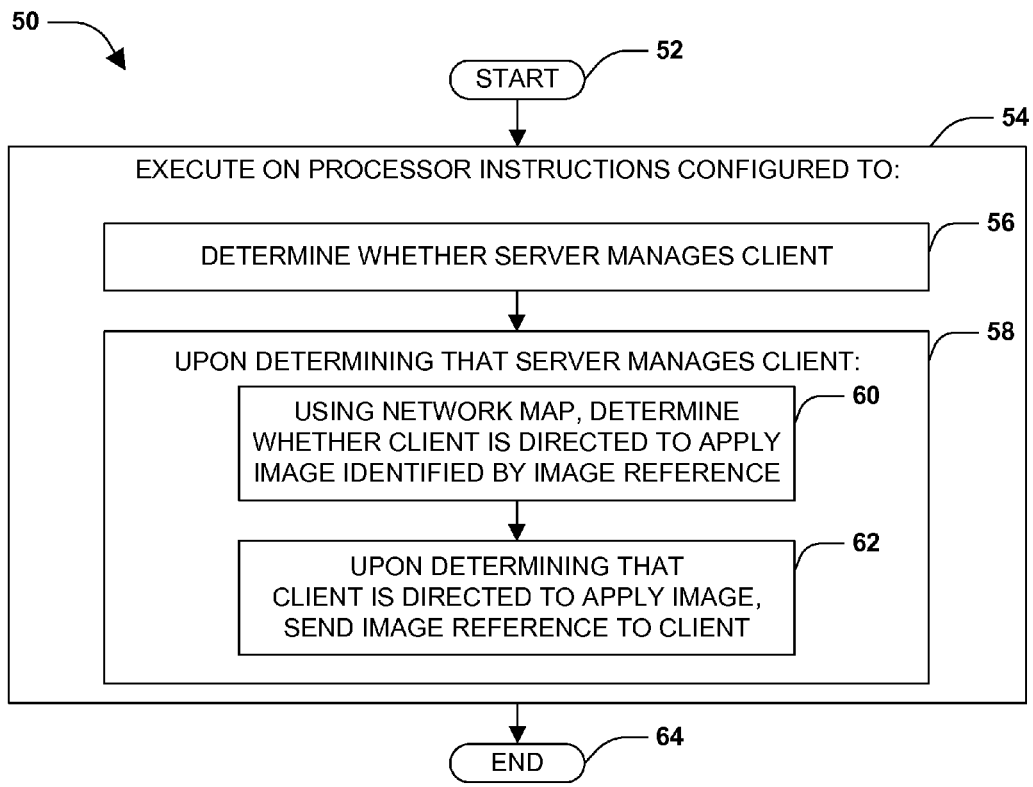
FIG. 3 is a flow chart illustrating an exemplary method of configuring a server to image clients using a network.

FIG. 3 presents a first embodiment of these techniques, illustrated as an exemplary method 50 of configuring a server 12 comprising a processor and having access to a network map 42 to image clients 16 over a network 18. The exemplary method 50 may be implemented, e.g., as a set of executable software instructions stored in a memory component of the server 12, such as system memory, a hard disk drive, a solid state storage device, or a magnetic or optical disc. The exemplary method 50 begins at 52 and involves executing 54 on the processor instructions configured to implement the techniques presented herein. In particular, the instructions are configured to, upon receiving an imaging query 24 from a client 16, determine 56 whether the server 12 manages the client 16. If the server 12 does not manage the client 16, the instructions may terminate the processing of the imaging query 24 and may withhold a reply. However, upon determining 58 that the server is assigned to manage the client 16, the instructions may be configured to, using the network map 42, determine 60 whether the client 16 is directed to apply an image 30 identified by an image reference 48. If not, the server 12 may be configured to withhold a further reply, or may be configured to reply affirmatively that the client 16 is not directed to apply an image 30 (e.g., by sending an imaging abort command 48); but if server 12 determines that the client 16 is directed to apply an image 30, the instructions may be configured to send 62 the image reference 48 to the client 16. In this manner, the server 12 may promote the configuration of the clients 16 through the use of images 30 in a scalable and customizable way while conserving the resources of the servers 12 and the network 18; accordingly, the exemplary method 50 ends at 64.

Figure 4:
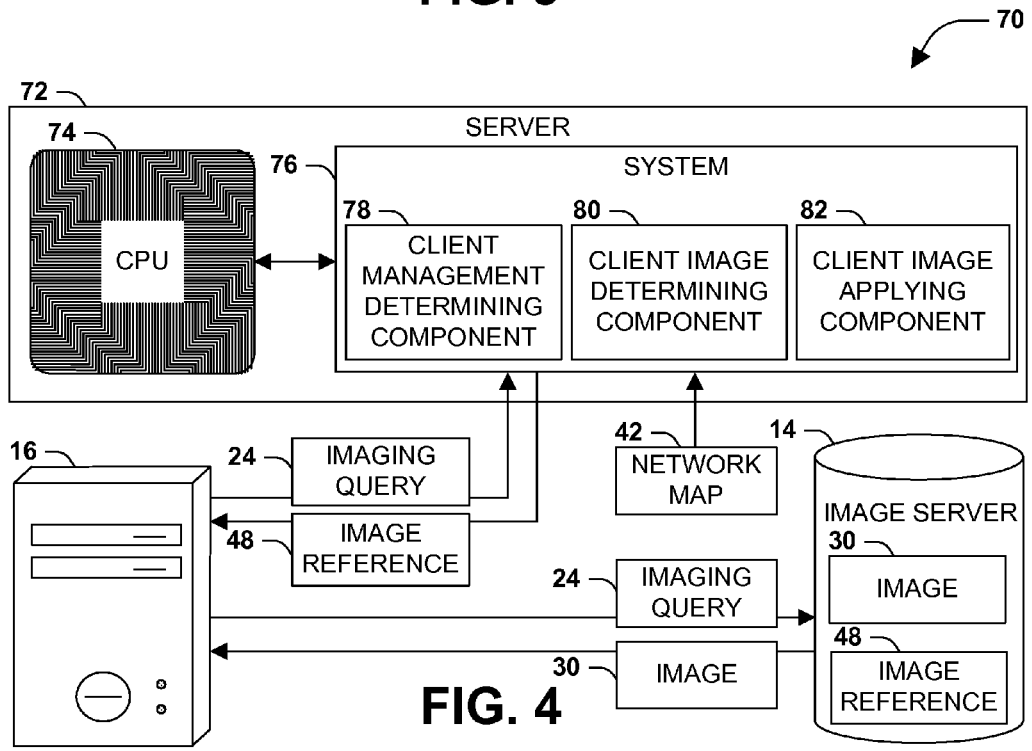
FIG. 4 is a component block diagram illustrating an exemplary system for configuring a server to image clients using a network.

FIG. 4 presents a second embodiment of these techniques, illustrated as an exemplary system 76 operating within a server 72 having a processor 74 and devised to configure the server 12 to image clients 16 using a network map 42, where respective images 30 are stored by an image server 14 and are identified by an image reference 48 (e.g., a uniform resource identifier (URI) or network path). The exemplary system 76 may be embodied, e.g., as a set of software instructions stored on a memory component of the server 12 (e.g., system memory, a hard disk drive, a solid-state storage device, or a magnetic or optical disc) that, when executed by the processor 74, embody a software architecture, comprising a set of software components that interoperate to perform the techniques presented herein. The exemplary system 76 comprises a client management determining component 78, which is configured to, upon receiving an imaging query 24 from a client 16, determine whether the server 12 manages the client 16. The exemplary system 76 also comprises a client image determining component 80, which is configured to, if the client managing component 78 determines that the server 12 is assigned to manage the client 16, use the network map 42 to determine whether the client 16 is directed to apply an image 30. The exemplary system 76 also comprises a client image applying component 82, which is configured to, upon the client image determining component 80 determining that the client 16 is directed to apply an image 30, send the image reference 40 of the image 30 to the client 16. In this manner, the exemplary system 76 achieves the imaging of clients 16 over the network 18 in accordance with the techniques presented herein.

Figure 5:
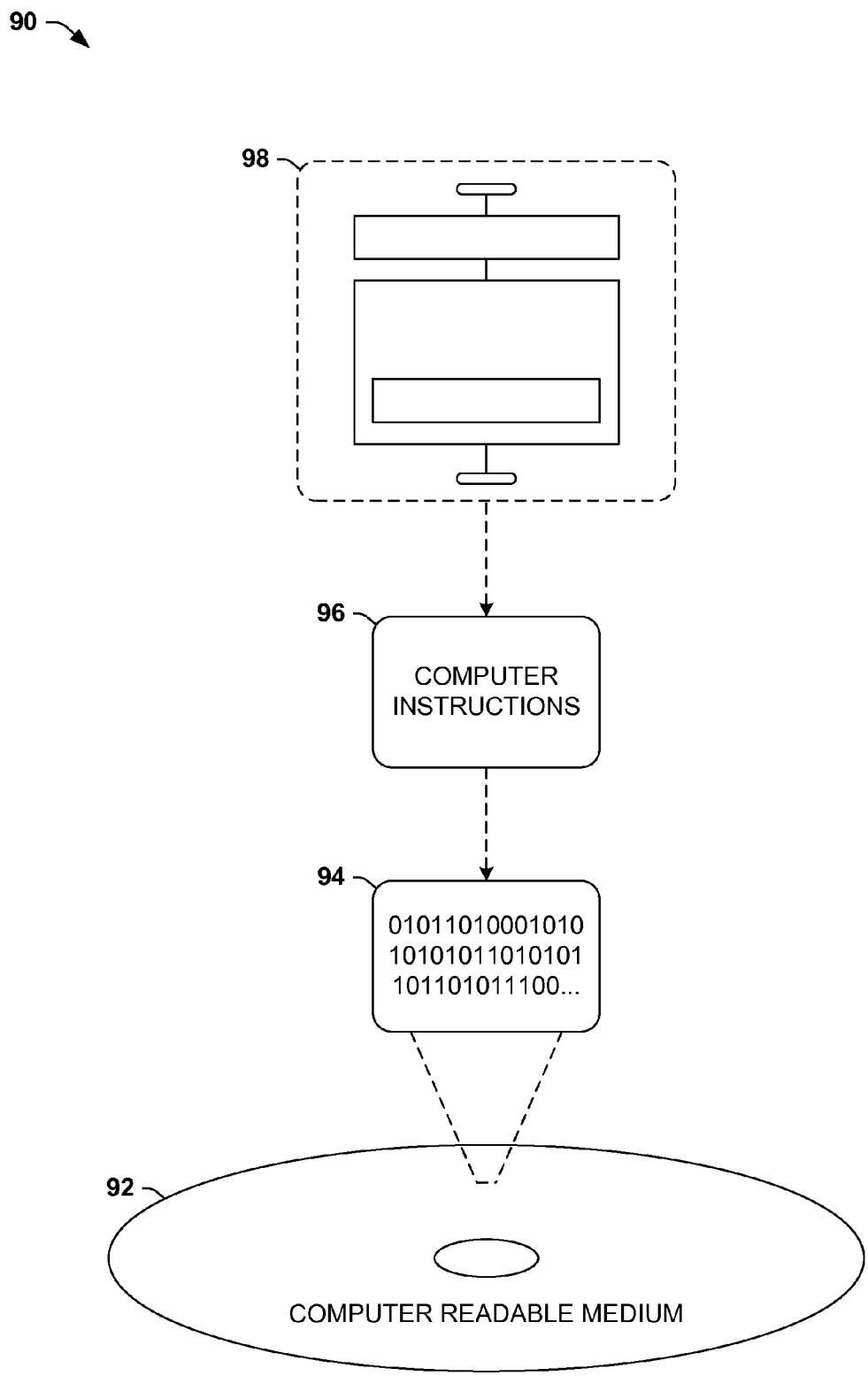
FIG. 5 is an illustration of an exemplary computer-readable medium comprising processor-executable instructions configured to embody one or more of the provisions set forth herein.

Still another embodiment involves a computer-readable medium comprising processor-executable instructions configured to apply the techniques presented herein. An exemplary computer-readable medium that may be devised in these ways is illustrated in FIG. 5, wherein the implementation 90 comprises a computer-readable medium 92 (e.g., a CD-R, DVD-R, or a platter of a hard disk drive), on which is encoded computer-readable data 94. This computer-readable data 94 in turn comprises a set of computer instructions 96 configured to operate according to the principles set forth herein. In one such embodiment, the processor-executable instructions 96 may be configured to perform a method of configuring a server to image clients using a network, such as the exemplary method 50 of FIG. 3. In another such embodiment, the processor-executable instructions 96 may be configured to implement a system for configuring a server to image clients using a network, such as the exemplary system 76 of FIG. 4. Some embodiments of this computer-readable medium may comprise a non-transitory computer-readable storage medium (e.g., a hard disk drive, an optical disc, or a flash memory device) that is configured to store processor-executable instructions configured in this manner. Many such computer-readable media may be devised by those of ordinary skill in the art that are configured to operate in accordance with the techniques presented herein.

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary method 50 of FIG. 3 and the exemplary system 76 of FIG. 4) to confer individual and/or synergistic advantages upon such embodiments.

A first aspect that may vary among embodiments of these techniques relates to the scenarios wherein such techniques may be utilized. As a first example, the techniques may be applied to manage computers on many types of wired and/or wireless networks 18, such as a wide area network (e.g., the internet), a regional area network (e.g., a cellular network), a local area network, and a personal area network. The network 18 may also be created and maintained in many contexts, such as a centrally managed corporate network, an academic or municipal network, or a network of devices managed by a particular service (e.g., a cellular network managed by a cellular carrier). As a second example of this first aspect, these techniques may be used to manage the imaging of many types of computers, such as personal computers, workstations, servers, remotely deployed devices (e.g., sensors distributed in a sensor network), and portable devices (e.g., mobile phones and personal data assistants (PDAs) of a cellular network). The devices may also be stateful (e.g., comprising a persistent memory component storing a set of software instructions over which the instructions of the image 30 are applied) and/or stateless (e.g., lacking a persistent memory component, but having a volatile memory component into which an image 30 is loaded, such as in a thin client configuration). As a third example of this first aspect, the images 30 may comprise many types of software, such as an operating system, a driver for a hardware or software component, or an application that may be executed on the client 16. The images 30 may also be applied integrally (e.g., completely overwriting all of the instructions currently stored on the computer) and/or differentially (e.g., adding instructions to the software of the computer, or replacing selective instructions stored by the computer).

One scenario where the techniques provided herein may be particularly advantageous involves a server farm, wherein a (potentially large) set of computers interoperate to distribute the computing processes involved in a service, such as the service of web pages comprising a large and complex e-commerce website. In such contexts, it may be desirable to assign clients 16 to various dedicated roles comprising different architectural layers of the service, such as a web page preparing role, a business logic role, an order processing role, and a data managing role. Additional capacity may be added to any of these architectural layers by adding clients 16 configured to operate in the corresponding role, thereby increasing the number of clients 16 over which the processing tasks of the role may be distributed. Accordingly, it may be desirable to select computers for each role that have similar sets of hardware components, and to configure all of the clients 16 in a particular role with the same image 30, thereby promoting consistent operation of all clients 16 within the role. Changes to the clients 16 within a role may therefore be achieved by generating a new image and directing all of the clients 16 within the role to obtain the image 30 over the network 18 and to apply the image 30 over the existing configuration. In accordance with this scenario, the techniques provided herein may be particularly suitable to promote the imaging of the clients 16 over the network 18 in a manner that both promotes the scalability of the imaging service (e.g., by distributing the processing tasks over several servers 12 and by reducing inefficient network communication), and by promoting the centralized declaration of images 30 to be applied to particular clients 16 (e.g., the clients 16 within a particular role). Some of the variations of the aspects discussed herein may be particularly suitable for this scenario. However, those of ordinary skill in the art may devise many scenarios wherein the general techniques and variations discussed herein may be suitable and advantageous.

A second aspect that may vary among embodiments of these techniques relates to the determination by a server 12 of whether or not a particular client 16 is assigned to the server 12. As a first example, a server 12 may determine such assignments by examining the network map 42. As a second example, the server 12 may determine such assignments by querying another server that is configured to make such determinations and provide responses in order to direct the actions of the servers 12 in interacting with clients 16. As a third example, the server 12 may comprise an application (such as a dynamic link library (DLL)) configured to determine whether a particular client 16 is managed by the server 12. For example, a DLL comprising a programmatic determination of assignments for any client 16 to any server 12 may be centrally generated and distributed to the servers 12 of the network 18. This example may be advantageous, e.g., for promoting rapid determinations of assignments, particularly in scenarios where the number of imaging queries 24 is comparatively high (e.g., where a large number of clients 16 operate and are frequently rebooted, thereby causing the servers 12 to handle a high volume of imaging queries 24).

As a fourth example of this second aspect, the server 12 may store a set of records, such as a set of assignments comprising an assignment set (e.g., a set of records in a table of a database, a set of entities in an extensible markup language (XML) document, or a set of objects in an object set), where respective assignments specify a client 16 assigned to the server 12; and the server 12 may perform this determination for a particular client 16 by determining whether the assignment set comprises at least one assignment specifying the client 16. The server 12 may specify assignments in the assignment set in many ways. In one such set of embodiments, various clients 16 may be associated with a particular role (e.g., a web page preparing role, a business logic role, an order processing role, or a data managing role), and a server 12 may be assigned to manage the clients 16 associated with a particular role. Accordingly, the server 12 may store in the assignment set one or more assignments for each client 16 associated with the roles assigned to the server.

In a first variation of this fourth example of this second aspect, the network map 42 may specify the roles associated with various clients 16; accordingly, the server 12 may be configured to determine the assignment of a particular client 16 by identifying the roles assigned to the server 12, using the network map 42 to identify the role associated with the client 16, and determining whether the role associated with the client 16 is one of the roles assigned to the server 12. This variation may be advantageous, e.g., for promoting a centralized administration of the roles of the clients 16 simply by updating the network map 42, and these administrative selections may be achieved for a particular client 16 simply by directing the client 16 to perform an imaging query 24 (e.g., by simply rebooting a client 16 having imaging querying capabilities included in the boot cycle, such as a PXE-based BIOS). When the client 16 performs the imaging query 24, the server 12 assigned to the client 16 (based on its current role according to the network map 42) may direct the client 16 to apply the image(s) 30 that fully configure the client 16 to operate in the specified role.

Figure 6:
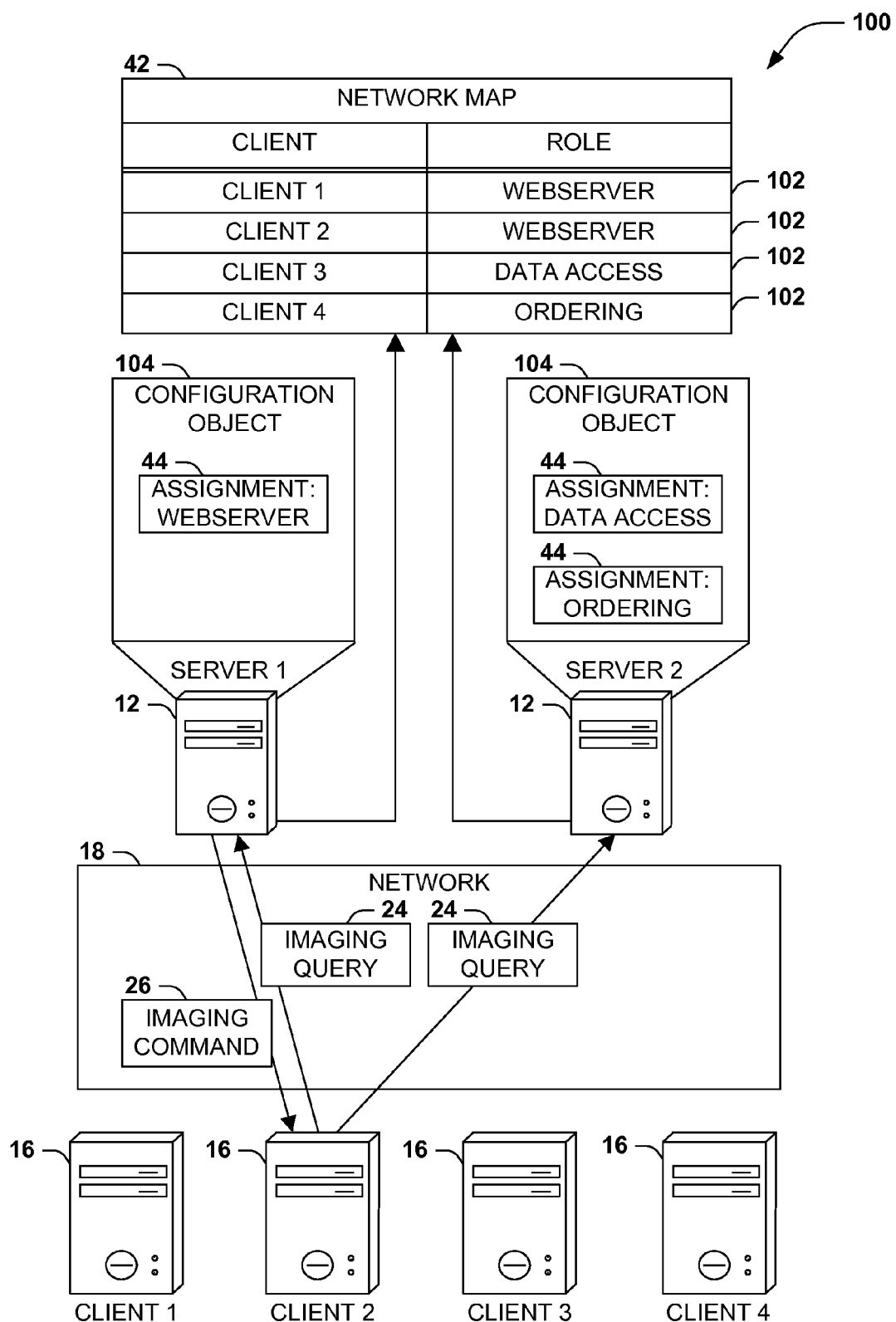
FIG. 6 is an illustration of an exemplary scenario featuring the determination of assignments of clients to servers based on an assignment set synchronized with a network map.

FIG. 6 presents an exemplary scenario 100 featuring servers 12 configured according to these techniques, and specifically configured to perform the determination of the assignment of clients 16 to servers 12 in the following manner. The servers 12 have access to a network map 42 that specifies various properties of the network 18, such as the assignment of clients 16 to network addresses. However, in this exemplary scenario 100, the network map 42 also indicates the association of clients 16 with roles 102, such as a webserver role, a data access role, and an order processing role. Additionally, respective servers 12 comprise a configuration object 104 indicating some properties of the server 12, and in particular comprising assignments 44 indicating the roles 102 of the clients 16 assigned to the server 12. For example, the first server 12 may be configured to manage all clients 16 assigned in a webserver role 102, and the second server 12 may be configured to manage all clients 16 assigned to a data access role 102 or an order processing role 102. Accordingly, when a client 16 issues an imaging query 24 (e.g., during a boot cycle) to the servers 12, each server 12 may examine its configuration object 104 to determine the roles 102 managed by the server 12, and may also identify the role 102 of the client 16. The server 12 may compare the role 102 of the client 16 with the roles 102 assigned to the server 12 according to the assignments 44 of the configuration object 104. For example, when the second client 16 sends imaging queries 24 to the first server 12 and the second server 12, the servers 12 may determine that the first server 12 is assigned the role 102 with which the second client 16 is associated according to the network map 42, and the first server 12 may issue an imaging command 26 (if appropriate) while the second server 12 withholds a reply to the imaging query 24. Embodiments configured in this manner may be advantageous, e.g., for permitting a centralized association of clients 16 with roles 102, and for permitting a comparatively simple configuration of the servers 12 in assigning roles 102 thereto.

In a second variation of this fourth example of this second aspect, the network map 42 may more directly specify the assignments 44 of clients 16 to servers 12. In such embodiments, each server 12 may maintain a fresh set of assignments 44 by synchronizing the assignments 44 of the network map 42 with the assignments 42 of the assignment set stored by the server 12. For example, the server 12 may monitor the network map 42 for updates to the assignments 42 (e.g., by polling the network map 42 for updates) and/or may accept a notification from the network map 42 (e.g., from a server storing the network map 42) that one or more updates to the network map 42 have been made.

Some embodiments configured according to this second variation involve the dual configuration of respective servers 12 as dynamic host configuration protocol servers (DHCP servers). In such embodiments, the assignment set may comprise a dynamic host configuration protocol table, which specifies (as assignments 42) one or more reservations of a client 16 with a reserved network address, such that the client 16 may be consistently assigned the same network address upon connecting to the network 18. Additionally, the imaging query 24 of the client 16 may comprise a dynamic host configuration protocol query (a DHCP query), comprising a request for allocation of a network address upon connecting to the network 18 (e.g., as part of the boot cycle of the client 16). The network map 42 may specify the network addresses reserved for various clients 16, and the server 12 may synchronize the network addresses stored in the DHCP table with the network addresses specified in the network map 42. Additionally, the DHCP table may be used to indicate the assignment of clients 16 to servers 12, such that, for each client 16 assigned to the server 12, the server 12 contains a reservation in the DHCP table. The server 12 may therefore store reservations only for the clients 16 managed by the server 12, and may determine whether the server 12 manages the client 16 by determining whether the DHCP table comprises at least one reservation associating the client 16 with a network address. Any such reservation may cause the server 12 to reply to imaging queries 24 (possibly concurrently with fulfilling a DHCP request received from the client 16, e.g., during a boot cycle). Such embodiments may be advantageous, e.g., for coupling the DHCP service of the client 16 with the imaging service of the client 16 to be handled by the same server 12.

A DHCP server configured to handle imaging queries 24 may be configured to synchronize the DHCP reservations with the network map 42 in the following manner. First, if respective clients 16 are associated with a role 102, the network map 42 may be designed to group the clients 16 associated with a particular role 102 together in the reservation of network addresses, e.g., as a set of contiguous network addresses spanning a numeric range. Accordingly, the DHCP server may be configured to identify a scope associated with the range of contiguous reservations for the clients 16 associated with the role 102 assigned to the server 12. For example, the DHCP server may, for all clients 16 assigned to the server 12 (e.g., for all clients 16 associated with a role 102 assigned to the server 12), the server 12 may examine the network addresses of the clients 16 in one role 102 to identify one or more range of contiguous addresses assigned by the network map 42, and for each such range, may create a scope in the DHCP table. The scope may be created, e.g., by storing the scope in the DHCP table, and also by storing in the DHCP table an assignment exclusion range covering the contiguous addresses. In this manner, the server 12 may recognize the scope, but may also exclude the entire set of addresses within the scope from dynamic allocation of network addresses (e.g., to avoid allocating such a network address to a different client 16 as part of the ordinary DHCP address allocation process). The server 12 may then create a reservation in the DHCP table for each client 16 in the range. Because the reservations override the assignment exclusion range, the clients 16 may be assigned addresses within the scope according to the reservations. In this manner, the server 12 may generate a DHCP scope for the range of clients 16 associated with the role 102 assigned to the server 12. Additionally, while synchronizing the DHCP table with the network map 42, the server 12 may also delete any scope from the DHCP table upon failing to detect any clients 16 associated with the role 102 of the scope, and may also update the reservations within the scope to reflect the network addresses assigned to the clients 16 in the network map 42. These actions, together, cause the server 12 to synchronize the assignments of the network map 42 with the reservations and scopes of the DHCP table. Such embodiments may also be advantageous, e.g., for providing an automated synchronization of the reservations of the DHCP server with the network map 42, which may alleviate the involvement of administrators in manually configuring the reservations of the DHCP server.

Figure 7:
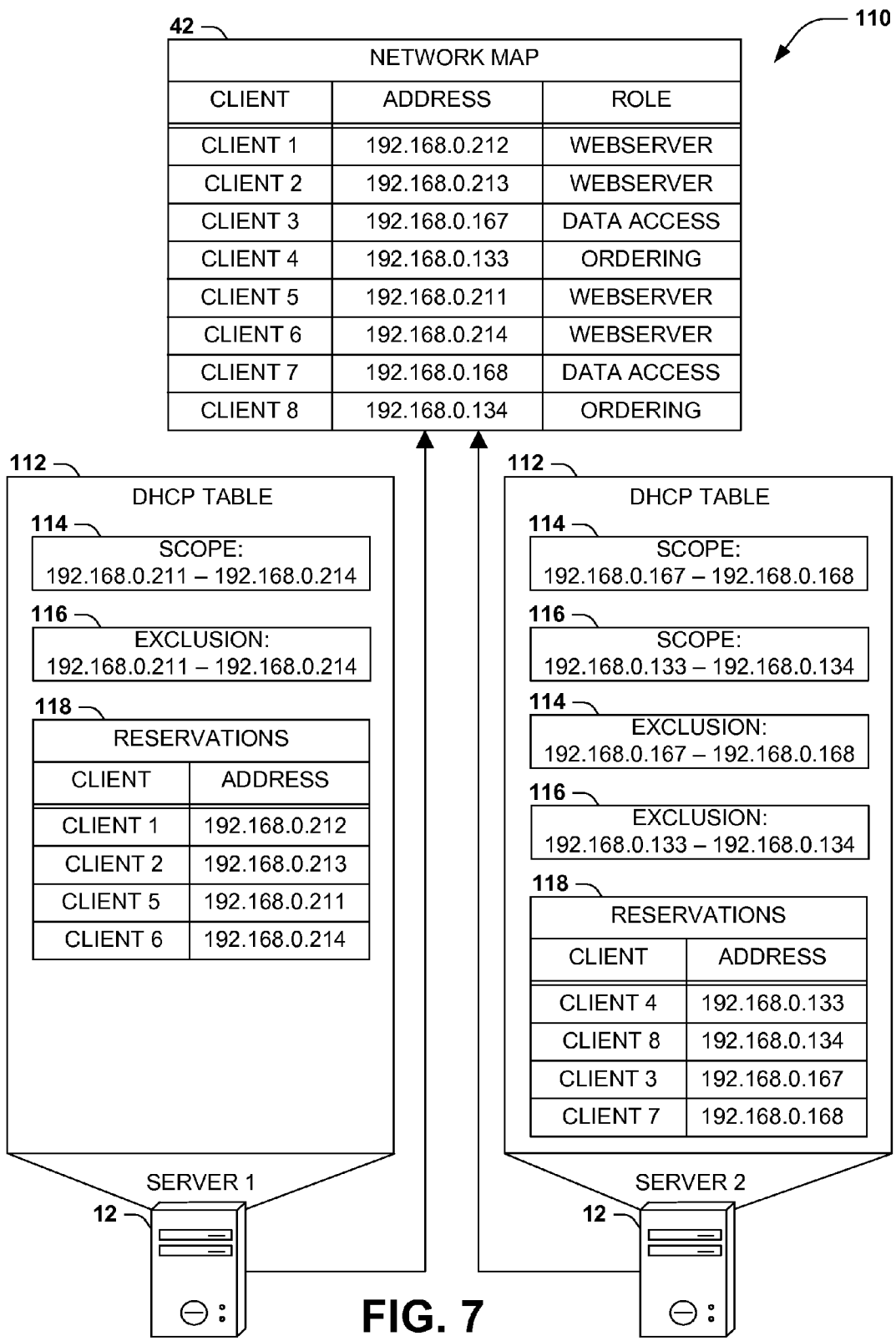
FIG. 7 is an illustration of an exemplary scenario featuring a synchronization of DHCP tables with assignments recorded in a network map.

FIG. 7 presents an exemplary scenario 110 featuring two servers 12 configured as DHCP servers. In this exemplary scenario 110, the network map 42 associates respective clients 16 with a network address and a role 102, and each server 12 endeavors to synchronize a DHCP table 112 stored by the server 12 with the network map 42. For example, the first server 12 is assigned to manage the clients 16 occupying the role 102 of a webserver. The first server 12 therefore examines the network addresses associated with all clients 16 associated with this role, and finds a contiguous set of network addresses from 192.168.0.211 to 192.168.0.214. Accordingly, the first server 12 allocates a DHCP scope 114 covering the range of network addresses from 192.168.0.211 to 192.168.0.214. The first server 12 also allocates a DHCP exclusion 116 covering the same range, in order to avoid dynamically assigning the network addresses to clients 16 not occupying this role 102. The first server 12 also creates selective reservations 118 in the DHCP table 112 to assign each client 16 to the network address within this scope specified by the network map 42. The second server 12 performs similar generation of scopes 114, exclusions 116, and reservations 118 to cover the roles 102 of data accessing and order processing. In this manner, the servers 12 synchronize the DHCP tables 112 to match the roles 102 and network addresses assigned to the clients 16 in the network map 42. Additionally, each server 12 may subsequently determine whether or not a client 16 issuing an imaging query 24 is managed by the server 12 by determining whether the DHCP table 112 of the server 12 comprises a reservation 118 for the client 16. Those of ordinary skill in the art may devise many ways of configuring severs 12 to determine whether or not a client 16 is assigned to the server 12 while implementing the techniques presented herein.

A third aspect that may vary among embodiments of these techniques relates to the configuration of a server 12 to determine whether a client 16 is directed to apply an image 16. For example, the server 12 may compare a current client image version of the client 16 with a target client image version of the client 16 (e.g., the image 30 that the client 16 is intended to use, as compared with the image 30 that the client 16 is currently using). Such versions may be identified, e.g., by querying the client 16 or by examining a record of the images 30 that the client 16 has previously been directed to apply. In one such variation, the network map 42 may store the current client image version (e.g., which may be updated by a server 12 or a client 16 upon applying an image 30 to the client 16) and/or the target client image version (e.g., which may be selectively set by an administrator to indicate that a particular client 16 is directed to apply a particular image 30). Those of ordinary skill in the art may devise many ways of determining whether an image 30 is to be applied to a client 16 while implementing the techniques presented herein.

A fourth aspect that may vary among embodiments of these techniques relates to the manner of configuring the server 12 to direct the client 16 to apply an image 30 by sending an image reference 48 of the image 30 to the client 16. As a first example, the server 12 may be configured as a preboot execution environment boot server (a PXE boot server), and the imaging query 24 of the client 16 may comprise a preboot execution environment boot query, to which the server 12 may respond by sending a preboot execution environment boot command to the client 16 specifying the image reference 48 of the image 30. Alternatively, if the server 12 determines that the client 16 is not currently directed to apply an image 30, the server 12 may send a preboot execution environment abort command directing the client 16 to abort the PXE portion of the boot cycle and to boot using the currently applied image 30.

As a second example of this fourth aspect, the server 12 may comprise an imaging log, comprising records indicating the imaging of clients 16 with images 30. Accordingly, upon directing a client 16 to apply an image 30 (e.g., upon sending an image reference 48 to a client 16, or upon receiving a message from the client 16 indicating the successful application of an image 30), the server 12 may log the imaging of the client 16 with the image 30 in the imaging log. Other actions may also be recorded in the imaging log (e.g., a failure, error, or exception in the applying of an image 30), and the imaging log may be used in various ways (e.g., to identify the current client image version of a client 16, based on the logged history of applied images 30). Those of ordinary skill in the art may devise many ways of configuring the server 12 to direct a client 16 to apply an image 30 while implementing the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 8:
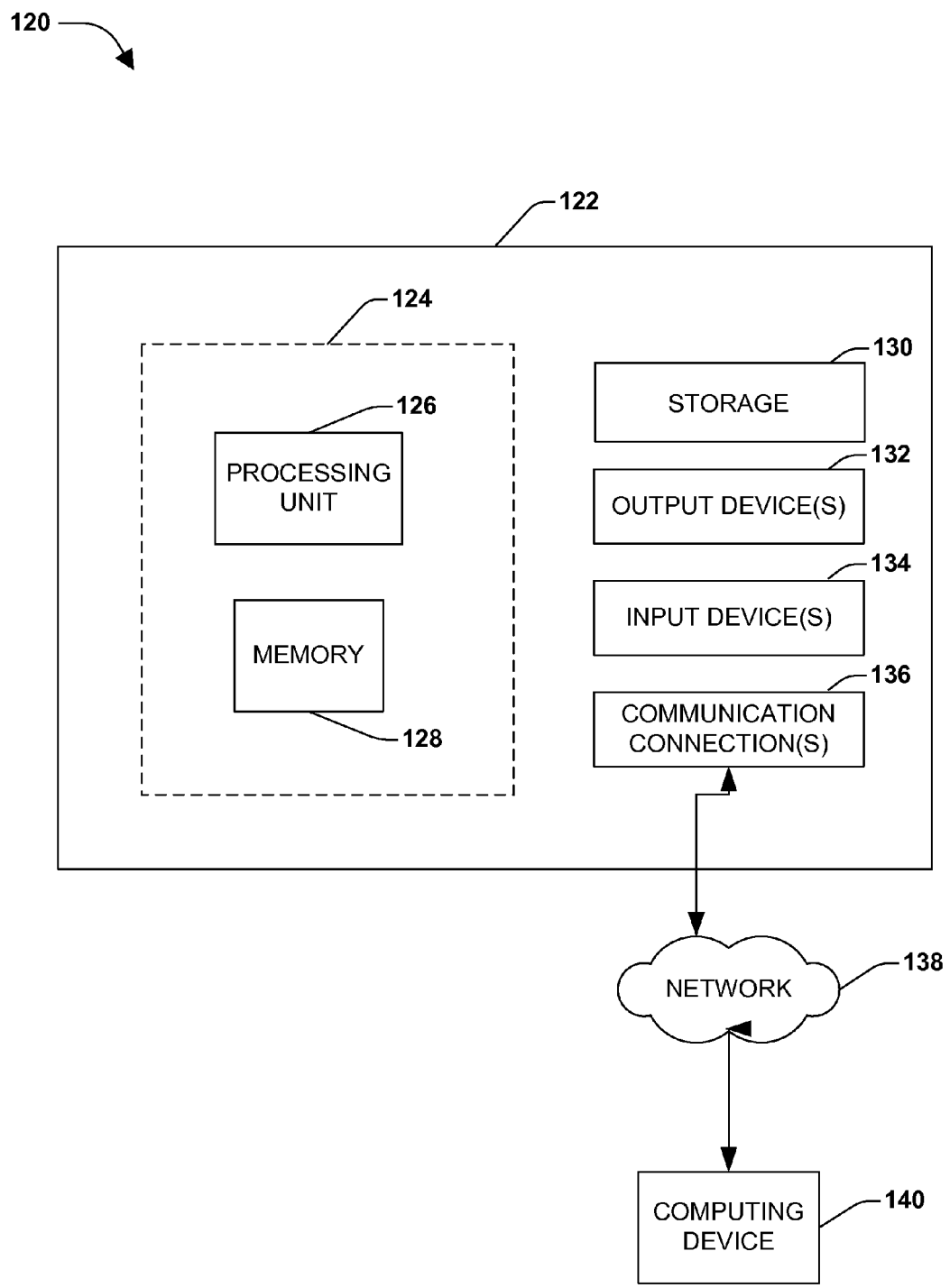
FIG. 8 illustrates an exemplary computing environment wherein one or more of the provisions set forth herein may be implemented.

FIG. 8 and the following discussion provide a brief, general description of a suitable computing environment to implement embodiments of one or more of the provisions set forth herein. The operating environment of FIG. 8 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 8 illustrates an example of a system 120 comprising a computing device 122 configured to implement one or more embodiments provided herein. In one configuration, computing device 122 includes at least one processing unit 126 and memory 128. Depending on the exact configuration and type of computing device, memory 128 may be volatile (such as RAM, for example), non-volatile (such as ROM, flash memory, etc., for example) or some combination of the two. This configuration is illustrated in FIG. 8 by dashed line 124.

In other embodiments, device 122 may include additional features and/or functionality. For example, device 122 may also include additional storage (e.g., removable and/or non-removable) including, but not limited to, magnetic storage, optical storage, and the like. Such additional storage is illustrated in FIG. 8 by storage 130. In one embodiment, computer readable instructions to implement one or more embodiments provided herein may be in storage 130. Storage 130 may also store other computer readable instructions to implement an operating system, an application program, and the like. Computer readable instructions may be loaded in memory 128 for execution by processing unit 126, for example.

The term "computer readable media" as used herein includes computer storage media. Computer storage media includes volatile and nonvolatile, removable and non-removable media implemented in any method or technology for storage of information such as computer readable instructions or other data. Memory 128 and storage 130 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 122. Any such computer storage media may be part of device 122.

Device 122 may also include communication connection(s) 136 that allows device 122 to communicate with other devices. Communication connection(s) 136 may include, but is not limited to, a modem, a Network Interface Card (NIC), an integrated network interface, a radio frequency transmitter/receiver, an infrared port, a USB connection, or other interfaces for connecting computing device 122 to other computing devices. Communication connection(s) 136 may include a wired connection or a wireless connection. Communication connection(s) 136 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 122 may include input device(s) 134 such as keyboard, mouse, pen, voice input device, touch input device, infrared cameras, video input devices, and/or any other input device. Output device(s) 132 such as one or more displays, speakers, printers, and/or any other output device may also be included in device 122. Input device(s) 134 and output device(s) 132 may be connected to device 122 via a wired connection, wireless connection, or any combination thereof. In one embodiment, an input device or an output device from another computing device may be used as input device(s) 134 or output device(s) 132 for computing device 122.

Components of computing device 122 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 122 may be interconnected by a network. For example, memory 128 may be comprised of multiple physical memory units located in different physical locations interconnected by a network.

Those skilled in the art will realize that storage devices utilized to store computer readable instructions may be distributed across a network. For example, a computing device 140 accessible via network 138 may store computer readable instructions to implement one or more embodiments provided herein. Computing device 122 may access computing device 140 and download a part or all of the computer readable instructions for execution. Alternatively, computing device 122 may download pieces of the computer readable instructions, as needed, or some instructions may be executed at computing device 122 and some at computing device 140.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A system for configuring a server to image clients using a network map and at least one image identified by an image reference, the server comprising a memory component, a processor, a network map identifying a role of at least one client, and an assignment set specifying at least one assignment of a role to the server, the system comprising:
   a client management determining component stored in the memory component that, when executed on the processor, upon receiving an imaging query from a client:
      determine, according to the network map, the role of the client; and
      determine whether the server is assigned to manage the client by determining, according to the assignment set, whether the server is assigned to manage clients associated with the role of the client;
   a client image determining component stored in the memory component of the that, when executed on the processor:
      upon the client management determining that the server is assigned to manage the client, determine, according to the network map, whether the client is directed to apply an image identified by an image reference; and
      upon determining that the server is not assigned to manage the client, refraining from sending the image reference to the client; and
   a client image applying component stored in the memory component that, when executed on the processor:
      upon the client image determining component determining that the client is directed to apply an image, send the image reference to the client; and
      upon the client image determining component determining that the client is not directed to apply an image, refrain from sending the image reference to the client.

2. The system of claim 1, the client management determining component configured to synchronize the assignments of the network map with the assignments of the assignment set.

3. The system of claim 2, the client management determining component configured to:
   monitor the network map to detect an update of at least one assignment specifying a client assigned to the server, and
   upon detecting an update, synchronize the assignments of the network map with the assignments of the assignment set.

4. The system of claim 1:
   the server comprising a dynamic host configuration protocol server;
   the assignment set comprising a dynamic host configuration protocol table comprising at least one reservation associating a client with a network address;
   the imaging query comprising a dynamic host configuration protocol query from the client.

5. The system of claim 4, the dynamic host configuration protocol table specifying at least one scope comprising contiguous reservations for clients associated with a role.

6. A method of configuring a server to image clients, the server comprising a processor, a network map identifying a role of at least one client, and an assignment set specifying at least one assignment of a role to the server, the method comprising:
   executing on the processor instructions configured to, upon receiving an imaging query from a client:
      determine, according to the network map, the role of the client;
      determine whether the server is assigned to manage the client by determining, according to the assignment set, whether the server is assigned to manage clients associated with the role of the client; and
      upon determining that the server is assigned to manage the client:
         using the network map, determine whether the client is directed to apply an image identified by an image reference;
         upon determining that the client is directed to apply an image, send the image reference to the client; and
      upon determining that the server is not assigned to manage the client, refraining from sending the image reference to the client.

7. The method of claim 1:
   the server comprising an imaging log indicating at least one imaging of a client with an image; and
   the server configured to, upon sending the image reference to the client, log in the imaging log the imaging of the client with the image.

8. The method of claim 6:
   the server comprising a dynamic host configuration protocol server;
   the assignment set comprising a dynamic host configuration protocol table comprising at least one reservation associating a client with a network address;
   the imaging query comprising a dynamic host configuration protocol query from the client.

9. The method of claim 8, determining whether the server manages a client comprising: determining whether the dynamic host configuration protocol table comprises at least one reservation associating the client with a network address.

10. The method of claim 8:
    the dynamic host configuration protocol table specifying at least one scope comprising contiguous reservations for clients associated with a role.

11. The method of claim 10, the server configured to:
    identify a scope associated with a role, the scope comprising at least two contiguous addresses among the reservations of clients associated with the role; and
    upon identifying the scope, create the scope in the dynamic host configuration protocol table.

12. The method of claim 10, creating the scope in the dynamic host configuration protocol table comprising:
    storing in the dynamic host configuration protocol table the scope;

storing in the dynamic host configuration protocol table an assignment exclusion range covering the contiguous addresses of the reservations of the clients associated with the role; and for respective clients associated with the role, storing in the dynamic host configuration protocol table a reservation assigning the client to an address within the assignment exclusion range.

13. The method of claim 10, the instructions configured to, upon failing to detect at least one client associated with a role of scope, delete the scope from the dynamic host configuration protocol table.

14. The method of claim 8:

the server comprising a preboot execution environment boot server;

the imaging query comprising a preboot execution environment boot query; and sending the image reference to the client comprising: sending a preboot execution environment boot command to the client specifying the image reference of the image.

15. The method of claim 14, the preboot execution environment boot server configured to, upon determining that the client is not directed to apply an image, send a preboot execution environment abort command.

16. The method of claim 1, determining whether the client is directed to apply an image comprising:

identifying a current client image version of the client;

identifying a target client image version of the client that is different from the current client image version.

17. The method of claim 16, the target client image version of respective clients specified in the network map.

18. The method of claim 6:

the server configured to synchronize the assignments of the network map with the assignments of the assignment set.

19. The method of claim 18, the server configured to:

monitor the network map to detect an update of at least one assignment specifying a client assigned to the server, and upon detecting an update, synchronize the assignments of the network map with the assignments of the assignment set.

20. A nonvolatile computer-readable storage device comprising instructions that, when executed on a processor of a server configured as a dynamic configuration host protocol server and a preboot execution environment boot server to image at least one client, the server comprising:

a dynamic configuration host protocol table comprising at least one reservation of a client to a network address, an imaging log indicating at least one imaging of a client with an image, a configuration object identifying at least one role assigned to the server, and a network map associating respective clients with a role and at least one assignment to a network address, by:

monitoring the network map to detect an update of at least one assignment specifying a client assigned to the server;

upon detecting an update, synchronizing the assignments of the network map with the assignments of the dynamic host configuration protocol table by:

identifying the at least one role assigned to the server;

using the network map, identifying the roles associated with respective clients; and for respective clients associated with a role assigned to the server according to the configuration object:

identifying a scope associated with a role, the scope comprising at least two contiguous addresses among the reservations of clients associated with the role;

creating the scope in the dynamic host configuration protocol table by:

storing in the dynamic host configuration protocol table the scope;

storing in the dynamic host configuration protocol table an assignment exclusion range covering the contiguous addresses of the reservations of the clients associated with the role; and for respective clients associated with the role, storing in the dynamic host configuration protocol table a reservation assigning the client to an address within the assignment exclusion range; and upon failing to detect at least one client associated with a role of scope, deleting the scope from the dynamic host configuration protocol table;

upon receiving from a client an imaging query comprising a dynamic host configuration protocol request:

determining whether the server manages the client by determining whether the dynamic host configuration protocol table comprises at least one reservation associating the client with a network address; and upon determining that the server manages the client:

using the network map, determining whether the client is directed to apply an image identified by an image reference by:

identifying a current client image version of the client, and identifying a target client image version of the client that is different from the current client image version;

upon determining that the client is directed to apply an image:

sending a preboot execution environment boot command to the client specifying the image reference of the image, and logging in the imaging log the imaging of the client with the image; and upon determining that the client is not directed to apply an image, sending a preboot execution environment abort command.

* * * * *